(12) United States Patent
Sensat

(10) Patent No.: US 6,325,432 B1
(45) Date of Patent: Dec. 4, 2001

(54) COVER LIFTING DEVICE

(76) Inventor: Elray J. Sensat, 12246 Craigen Rd., Beaumont, TX (US) 77705

( * ) Notice: Subject to any disclaimer, the term of this patent is extended or adjusted under 35 U.S.C. 154(b) by 0 days.

(21) Appl. No.: 09/629,962

(22) Filed: Aug. 1, 2000

(51) Int. Cl.$^7$ .................................................. B65G 7/00
(52) U.S. Cl. ................................................ 294/16; 294/118
(58) Field of Search ....................... 294/16, 17, 28–31.1, 294/50.8, 118; 254/113, 123, 131; 81/3.07, 3.4, 3.41, 3.44; 29/245

(56) References Cited

U.S. PATENT DOCUMENTS

| | | | | |
|---|---|---|---|---|
| 1,231,035 | * | 6/1917 | Luthman | 294/16 |
| 1,343,518 | * | 6/1920 | Masker | 294/28 |
| 1,607,204 | * | 11/1926 | Linzmaier | 294/118 |
| 1,767,898 | * | 6/1930 | Sargent | 294/118 |
| 2,044,656 | * | 6/1936 | Wright | 294/118 |
| 3,153,554 | * | 10/1964 | Beihl | 294/118 |
| 3,747,972 | * | 7/1973 | Mespelt | 294/118 |
| 4,076,217 | * | 2/1978 | Haller et al. | 254/131 |
| 4,572,566 | * | 2/1986 | Terrington | 294/16 |
| 5,004,282 | * | 4/1991 | Perry | 294/16 |
| 5,070,564 | * | 12/1991 | Fey | 294/16 |

FOREIGN PATENT DOCUMENTS

11360  *  10/1908  (DK) .................................... 294/118

* cited by examiner

*Primary Examiner*—Dean J. Kramer
(74) *Attorney, Agent, or Firm*—The Matthews Firm

(57) ABSTRACT

A cover lifting device with inwardly turned handles capable of forming a hand hold when engaged to manipulate and remove covers of various weights and sizes. The device comprises a pair of lever arms which are pivotally connected and having inwardly turned handles to form a hand hold when engaging and removing covers. The notched ends of the jaws of the device generally facilitate engaging covers that require unthreading before removing.

8 Claims, 1 Drawing Sheet

COVER LIFTING DEVICE

TECHNICAL FIELD

The present invention relates generally to devices for lifting and removing covers and more particularly to an improved cover lifting device for removing and manipulating covers that are modified such that the user can pry open the cover and remove it.

BACKGROUND ART

There are various types of covers that are particularly difficult to remove because of the shape of the cover and its weight depending on what type of material is used in manufacturing the cover. Many covers, such as those for manholes, sewers, storage tanks and water meters are manufactured of heavy metals and difficult to remove because of the small distance between the cover and the reservoir within which the cover is placed. Many of these covers are threaded which further presents a problem when trying to unthread the cover before removing it due to the lack of space between the cover and the reservoir which the cover resides. This presents a problem upon removal in that it is difficult to manipulate and remove the cover without the use of an object or some sort of lever to unthread and pry open the cover and then physically pick it up. Without a device for removal, it is necessary for persons to use their hands thereby increasing the risk of possible injury to the hand or fingers. By way of example and not limitation, the description of the present invention will be given herein in relation to a device for prying open, lifting and removing covers such as those described above. However, those of ordinary skill in the art will be able to see that the invention may be used for a wide variety of functions and covers.

Accordingly, most tools and devices are designed for performing a specific task such as removing covers on spark plugs, tightening or loosening screws or bolts in difficult to reach places, and for general purpose uses such as gripping and manipulating various articles. Unfortunately, none of the devices or tools are designed to unthread and remove a cover of a storage tank or similar difficult to remove covers. This is a large problem in the art field.

Devices similar to the present invention found in the prior art do not have designs to accommodate the general shape and construction of covers to obtain the objective of unthreading and removing such covers. Further, the prior art devices similar to the present invention do not have inwardly turned handle ends which form a hand hold when engaged for gripping and lifting covers of varying sizes and weights. The prior art devices have not solved the problem of the necessity of the use of a person's hands in unthreading and removing the covers which increases the risk of possible injury to the hand or fingers.

One example is described in U.S. Pat. No. 1,506,675 that describes tongs having crossed handles and square notches formed in the jaws for engaging a workpiece. This invention has a pair of opposed jaws which are notched so that when the jaws are closed a squared opening is formed. This invention has straight handles and is designed to enter the universal joint tang and into the squared opening of the drive plate assembly of the type comprised in Ford automobiles. The '675 patent is not designed for engaging covers and does not have inwardly turned handles that would similarly provide a hand hold when engaged for removing covers. Another example in the art field is U.S. Pat. No. 4,125,938. This patent describes a pliers type tong tool having turned handles for the removal of a spark plug cover. However, the turned ends of the handles turn outwardly rather than inwardly, and thus can not serve as a hand hold to remove and lift covers in the manner of the present invention. U.S. Pat. No. 1,250,365 shows a pliers type tong tool having inwardly turned handles. However, the inwardly turned ends of the handles meet in direct interference, and thus can not serve as a hand hold in the manner disclosed in the present invention. Finally, U.S. Pat. No. 1,293,696 has notches formed in each jaw which form complementary portions of a hexagonal opening for engaging a workpiece. The '696 patent is not designed to lift a cover such as the present invention. Further, the '696 has straight handles that can not form a hand hold for lifting covers of any significant weight.

None of these teach nor suggest using inwardly turned handle ends to form a hand hold for removing and lifting covers.

Accordingly, it is an object of the present invention to provide an improved cover lifting device with inwardly turned handles to form a hand hold when removing various covers.

SUMMARY OF THE INVENTION

The present invention comprises an improved cover lifting device for lifting and unthreading covers of various weights and sizes including manhole covers, liquid storage tank covers, sewer and water meter covers, comprising a first flat elongate lever arm having a first end and a second end, the first end adapted for engaging a cover; a second flat elongate lever arm having a first end and a second end, the first end adapted for engaging a cover, the second flat elongate lever arm pivotally connected to the first flat elongate lever arm; a first handle attached to the second end of the first flat elongate lever arm and inwardly disposed at an angle from the first lever arm; a second handle attached to the second end of the second elongate lever arm and inwardly disposed at an angle from the second lever arm, the first handle and second handle forming a hand hold when manually gripped.

Because of the preferred embodiment's inwardly turned handles, the present invention is capable of forming a hand hold when engaged to lift covers that vary in weight from small to large depending on the type of materials used in manufacturing the cover. A preferred embodiment's inwardly turned handles facilitates the prying open of the lid so that it can be engaged and removed. Further, the preferred embodiment's notched ends can be used to engage a workpiece and remove covers that require unthreading before removal.

This summary is not intended to be a limitation with respect to the features of the invention as claimed, and this and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

GENERAL DESCRIPTION AND PREFERRED MODE FOR CARRYING OUT THE INVENTION

Figure 1:
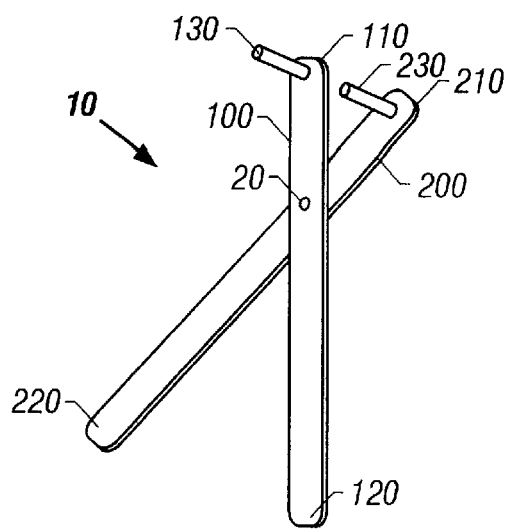
FIG. 1 is an illustration of an embodiment of the present invention with inwardly turned handles.

Referring now to FIG. 1, an illustration of the general orientation of the device of a preferred embodiment of the present invention, in a preferred embodiment device 10 has a first lever arm 100 and second lever arm 200 which are flat and elongate with the flat side of first lever arm 100 positioned against the flat side of lever arm 200 in the same plane and connected by a pivot 20. The first lever arm 100 has a first end 110 and a second end 120. The second lever arm 200 has a first end 210 and a second end 220. The first handle 130 is attached to the first end 110 of the first lever arm 100 and is positioned substantially perpendicular to the first lever arm 100. The second handle 230 is attached to the second end 210 of the second lever arm 200 and is positioned substantially perpendicular to the second lever arm 200. The second end 120 of the first lever arm 100 and the second end 220 of the second lever arm 200 may comprise various configurations such as a notched jaw with ridges 123 (shown in FIG. 3), grooves 122 (shown in FIG. 3), pointed ends 121 and 123 (shown in FIG. 3), smooth end 124 (shown in FIG. 4), and notched jaw without ridges or grooves 125 (shown in FIG. 4).

In a preferred embodiment, device 10 comprises a metal, by way of example and not limitation such as steel, aluminum, copper, lead, tin, or alloys thereof. However, device 10 may be constructed of any material common in the art such as a resin like polyvinyl chloride plastic, such as high density polypropylene, or any combination thereof.

In a preferred embodiment, the pivot 20 may be comprised of a number of combinations of separate pieces and may be connected by a connector means, all of which are commonly known to those skilled in the fabrication arts, such as screws, nails, rivets, welds, or other methods of or combinations of methods of movable attachment.

In a preferred embodiment, device 10 comprises a first handle 130 and second handle 230 which is substantially perpendicular to the flat elongate lever arms 100 and 200 at the first ends 110 and 210. The inward turned handles 130 and 230 are positioned so that a user can form a hand hold when gripping the handles to allow manipulation, lifting, unthreading and ultimately removal of covers of various weights and sizes including manhole covers, liquid storage tank covers, sewer and water meter covers. Handles 130 and 230 may be separate pieces and may be connected by a connector means, all of which are commonly known to those skilled in the fabrication arts, such as an adhesive like glue, nails, screws, rivets, welds, pivots or other methods of or combinations of methods of attachment.

Figure 6:
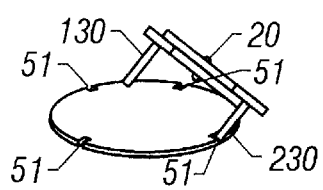
FIG. 6 is an illustration of an embodiment of the invention showing the handles of the device inserted into a cover for prying or manipulating the cover open.

Additionally handles 130 and 230 can be used to pry open a cover by using the handle end as a lever to facilitate in the removal of the cover as illustrated in FIG. 6. A preferred embodiment of the present invention envisions device 10 being formed of metal and handles 130 and 230 of wood, metal, or a resin like polyvinyl chloride plastic, such as high density polypropylene, or any combination thereof, where device 10 is attached to handles 110 and 210 by an adhesive like glue, nails, screws, rivets, welds, pivots or other methods of or combinations of methods of attachment. In an alternative preferred embodiment, device 10 and handles 130 and 230 may also comprise a single body 10 and be formed by an appropriate means, by way of example and not limitation including extrusion, molding, casting, or other methods familiar to those skilled in the fabrication arts, such as from high density polypropylene.

In a preferred embodiment, handles 130 and 230 extends from device 10 and lever arms 100 and 200 in a substantially perpendicular plane different from that of lever arms 100 and 200 and device 10. Handles 130 and 230 are inwardly turned in a way that forms a hand hold when gripped for clutching, manipulating, turning, unthreading, and removing covers of various weights and sizes.

Figure 2:
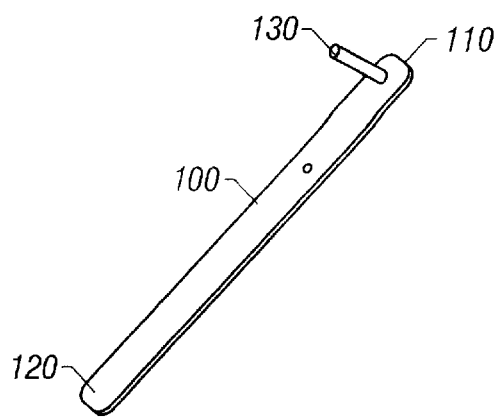
FIG. 2 is a cross section view of the present invention showing substantially perpendicular handles.

Referring now to FIG. 2, a cross-sectional view of first lever arm 100 and first handle 130. The embodiment of first handle 130 in FIG. 2 is illustrative of the substantially perpendicular position of the handles and inwardly turned position relative to first lever arm 100. It may be observed that handle 130 is positioned at or near the first end 110 of lever arm 100.

Figure 3:
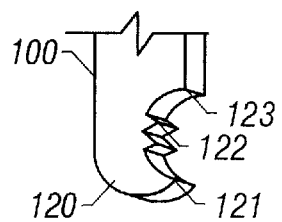
FIG. 3 is an illustration of an embodiment of the present invention with a rigidly notched jaw and pointed end.

Referring now to FIG. 3., an embodiment of the present invention showing second end 120 of first lever arm 100 with a notched jaw with ridges 122 and pointed ends 121 and 123. The number of ridges can be varied depending on the type, size and shape of the cover to be lifted.

Figure 4:
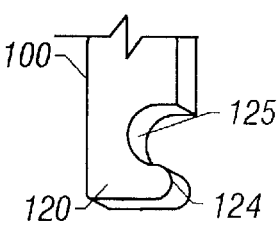
FIG. 4 is an illustration of an embodiment of the present invention with a smoothly notched jaw and a substantially rounded end.

Referring now to FIG. 4, an embodiment of the present invention showing second end 120 of first lever arm 100 with a notchedjaw without ridges 125 and a rounded end 124. The design of the notched jaw can vary depending on the type of cover to be lifted. Depending on the design of the notches in the jaws, the angle with which fulcrum and compression forces are exerted on he cover that is lifted can be varied.

Figure 5:
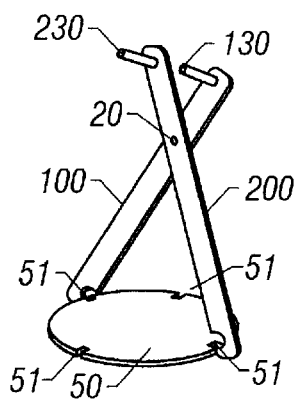
FIG. 5 is an illustration of an embodiment of the invention inserted into a cover.

Referring now to FIG. 5, an embodiment of the invention illustrating insertion of device 10 into a cover 51, the device 10 is shown positioned into groove 51 of the cover 50. Once positioned, handles 130 and 230 grip together to form a hand hold which enables manipulation, lifting, unthreading and ultimately removal of covers of various weights and sizes including manhole covers, liquid storage tank covers, sewer and water meter covers. Further, the ends of the device 10 are blades with a gripping means on the end so that the blades can be inserted into groove 51. When the handles of device 10 are gripped, the blades of device 10 move toward each other allowing for positioning into groove 51.

Referring now to FIG. 6, an embodiment of the invention illustrating that handles 230 and 130 may be inserted into the groove 51 or lip of a cover for prying open the cover by using the handle as a lever to unseat or remove the cover.

Figure 7:
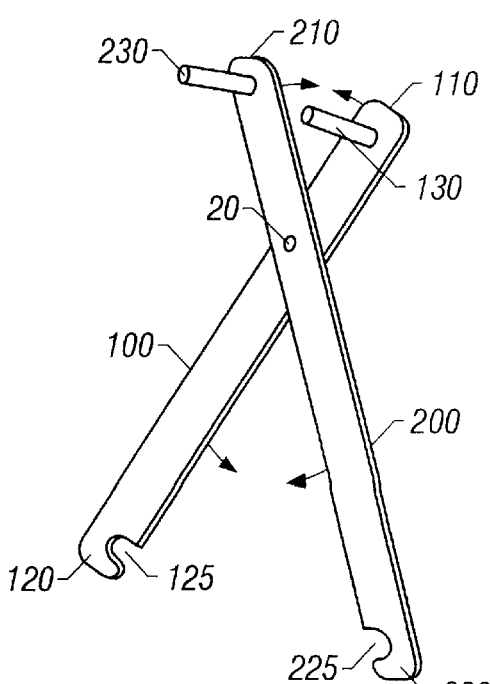
FIG. 7 is an of an embodiment of an invention showing the directional movement of the lever arms and placement of the handles which form a hand hold when engaged.

Referring now to FIG. 7, an embodiment of the invention showing the directional movement of the lever arms and placement of the handles which form a hand hold when engaged. Lever arms 100 and 200 are slidably engaged by a pivot 20 and move in the same plane. Handles 130 and 230 move inward and form a hand hold when manually gripped or engaged. On the opposite ends 120 and 220, a cover can be engaged by the compression and fulcrum forces placed upon the cover when the device is engaged. The directional arrows illustrate how the device uses fulcrum and compression forces to manipulate the cover.

It will be readily apparent to those of skill in the art that this improved cover lifting device may be easily inserted into and used to pry, manipulate, unthread, unseat, and ultimately remove covers of various weights and sizes including manhole covers, liquid storage tank covers, sewer and water meter covers.

In view of the above disclosure, it will be seen that the present invention has attained many advantages over the prior art.

It may be seen from the preceding description that an improved cover lifting device for unthreading, lifting and removing covers of various weights and sizes including manhole covers, liquid storage tank covers, sewer and water meter covers has been provided.

It is noted that the embodiment of the improved cover lifting device for unthreading, lifting and removing covers of various weights and sizes described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A cover lifting device wherein the device has at least two lever arms having a notch in a first end for engaging a cover, comprising:

a first flat, substantially straight arm having the first end substantially in the same plane as the first arm and a second end;

a second flat, substantially straight arm having the first end and a second end pivotally connected to the first arm;

a first handle connected to a second end of the first arm, the first handle being disposed inwardly with respect to the first arm; and a second handle connected to a second end of the second arm, the second handle being disposed inwardly with respect to the second arm.

2. A cover lifting device comprising:

a first flat, substantially straight arm having a first end substantially in the same plane as the first arm and a second end;

a second flat, substantially straight arm having a first end and a second end;

means for pivotally connecting the first flat arm and the second flat arm;

handle means disposed inwardly with respect to the first arm and handle means disposed inwardly with respect to the second arm; and, means for gripping a cover disposed in the first end of the first arm and the first end of the second arm.

3. The cover lifting device of claim 1 or 2 wherein the first end has a plurality of notches.

4. The cover lifting device of claim 1 or 2 wherein a portion of the first end is concave.

5. The cover lifting device of claim 1 or 2 wherein a portion of the first flat arm is rounded.

6. The cover lifting device of claim 1 wherein a portion of the notch has ridges.

7. The device of claim 1 wherein a portion of the first handle is attached substantially planar to the first lever arm.

8. The device of claim 2 wherein the means for gripping has at least one ridge.

* * * * *